United States Patent Office

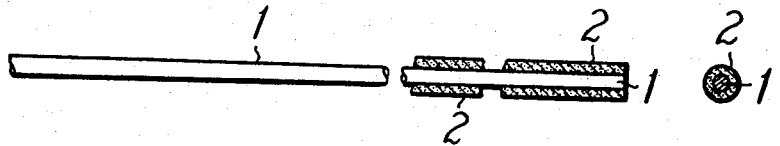

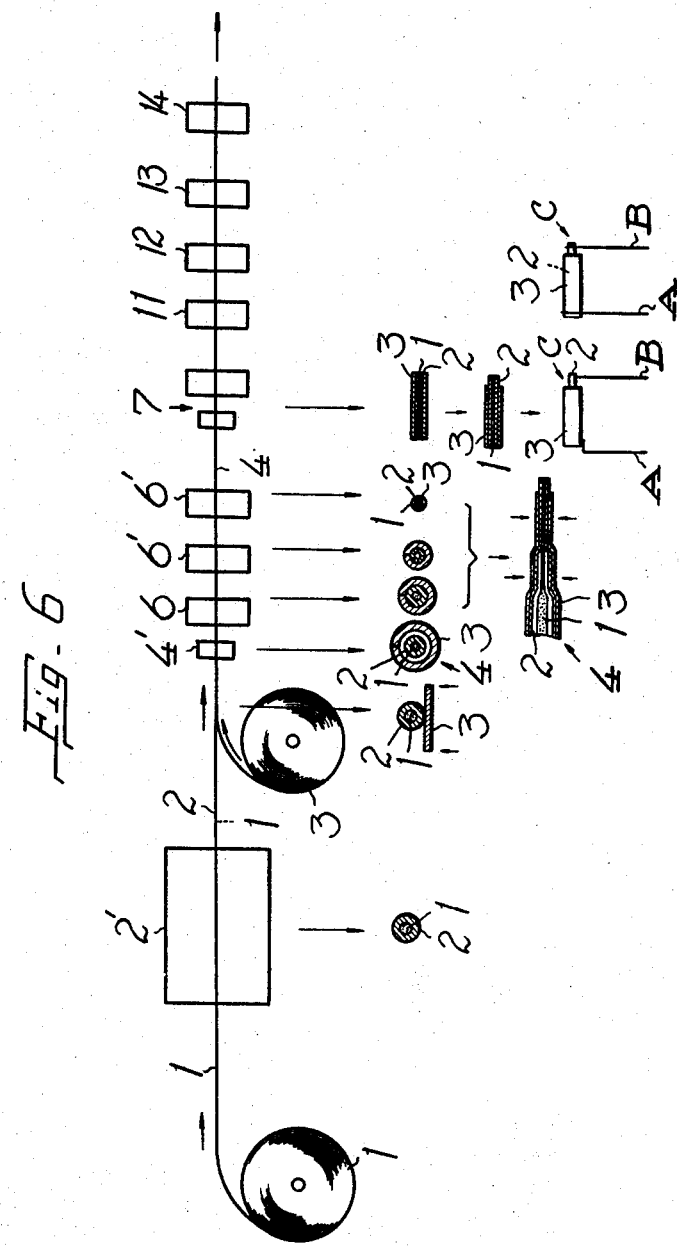

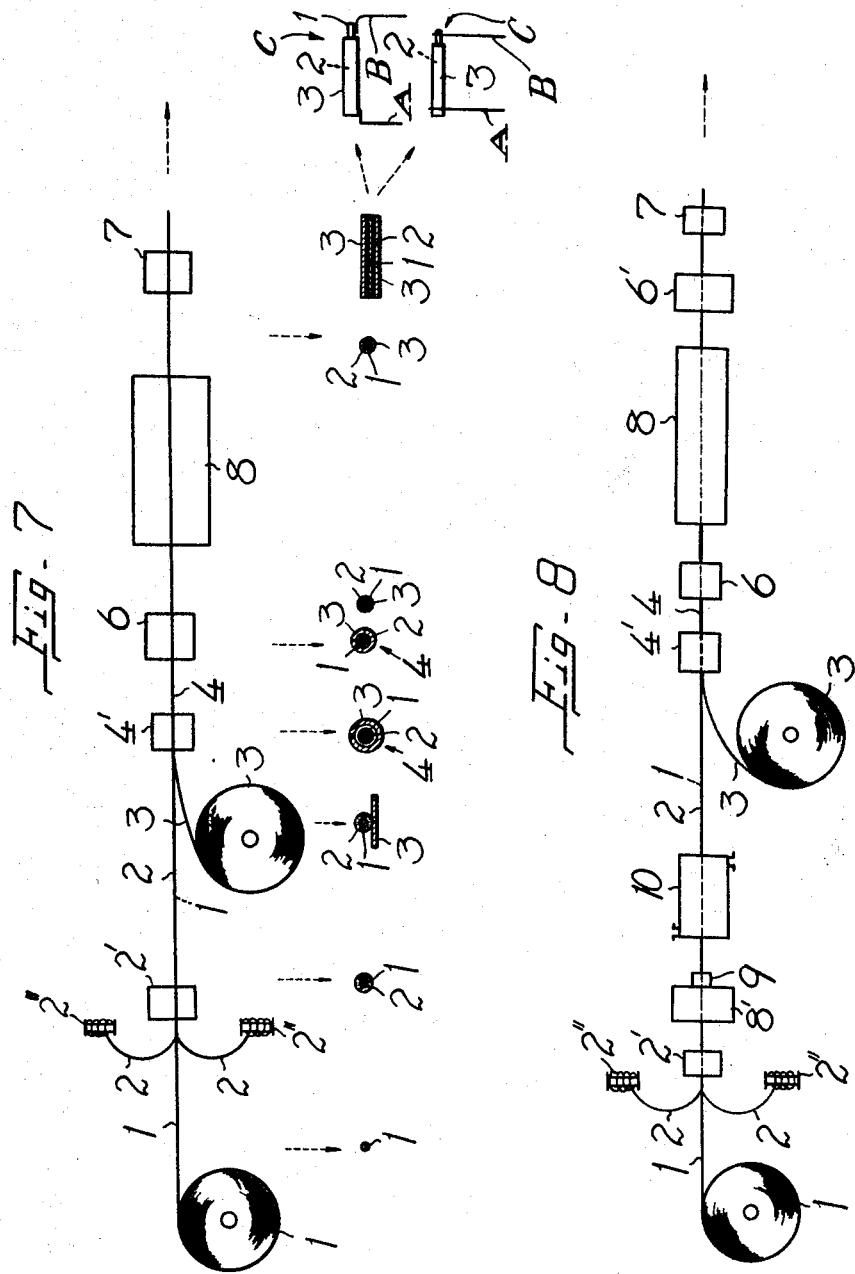

3,443,293
Patented May 13, 1969

3,443,293
METHOD OF MANUFACTURING CAPACITORS
Sho Masujima, 3366–9 Oaza Ueda, Ueda-shi,
Nagano-ken, Japan
Filed June 2, 1966, Ser. No. 554,787
Claims priority, application Japan, Sept. 3, 1965,
40/53,961; Dec. 28, 1965, 40/81,076; Dec. 29,
1965, 40/81,559
Int. Cl. H01g *13/00*
U.S. Cl. 29—25.42                    5 Claims

ABSTRACT OF THE DISCLOSURE

A method for manufacturing capacitors wherein a synthetic resin or dielectric material containing a synthetic resin is continuously applied to a conductive internal electrode in rod or tube form, as by injection molding or by winding lengths of threads, fibers or tapes formed from the material; a pipe-like or tape-shaped conductive external electrode is disposed about said covered length of conductive internal electrode to form a capacitor assembly; said capacitor assembly is struck and elongated to thin and press together the layered components thereof; and subsequently cut into individual capacitors of a length determined by the desired capacity thereof. Where the intermediate layer is formed from a fiber, thread or tape, the capacitor assembly is preferably heated to a temperature above the melting temperature of said intermediate layer.

---

This invention relates to a method of manufacturing capacitors, and more particularly, to a manufacturing method whereby capacitors can be manufactured in a continuous through process.

An object of this invention is to achieve a sharp reduction in cost by means of a continuous and through automotive operation in the main process of manufacture of capacitors, which permits the manufacture with high efficiency and the simplification of such operation with the result of reduction in running expenses and cost of production.

Another object of this invention is to make capacitors of high quality without difficulty, which are improved in capacity by minimizing the inter-electrode gap and in accuracy, and also hardly damaged by external mechanical force.

A still another object of this invention is to present such a manufacturing method in which thin capacitors may be produced without cracks thereon and with even thickness so as to have uniform characteristic, thereby enabling production without requiring measurement of capacity.

Furthermore, the present invention is directed to provide capacitors economically in a way that products may be given any desired capacity by cutting them in line form successively at some length, and used in any form, folded or wound.

The method of manufacturing a capacitor in accordance with this invention is characterized in that the capacitor is formed by striking and elongating into a rolled fine line a combination consisting of a conductive internal electrode, an intermediate layer made of dielectric material, and a conductive external electrode arranged concentrically.

Shown in the accompanying drawings are embodiments of this invention, wherein;

FIGS. 1 to 3 are side and front views in cross section in the manufacturing process;

FIGS. 4 and 5 are side views in cross section of products;

FIGS. 6 to 8 show flow charts explanatory of processes as well as products at successive stages in vertical and cross sectional views and in side view in parallel relation.

Referring to the drawings the invention will be explained.

In FIGS. 1 to 5 an assembly 4 composed of an internal electrode 1 made of conductive material, an intermediate layer 2 made of dielectric material, and an external electrode 3 made of conductive material, which are concentrically arranged in such order, is given high mechanical pressure externally by means of swaging machine or rolling mill or drawing dies to be pressed and elongated in its axial direction into the form of a slender line, and then cut into pieces at a suitable length. Internal and external electrodes 1 and 3 are provided with lead wires A and B respectively to form a capacitor.

As conductive material such metallic wire as aluminium, brass, copper or silver (0.1 to 3 mm. for instance) or a tube made thereof may be used for the internal electrode 1, which is covered therearound with the intermediate layer 2 of synthetic resin such as soft or semihard polyethylene, polypropylene and polyester (0.2 to 0.5 to 1 mm. for instance) (FIG. 1).

If required, another dielectric coating layer (not shown), formed of a base of synthetic resin and powder with small dielectric loss such as titanium oxide added thereto evenly and dispersedly at a ratio of 10% or so, may also be provided between the internal electrode 1 and the intermediate layer 2 or on the external surface of the intermediate layer 2.

Then, around a line material of 1 to 3 mm. in diameter formed by coating said intermediate layer on the internal electrode 1 thus obtained the external electrode 3 is provided, which has the internal diameter 1.3 to 1.5 times as large as said external diameter so as to be inserted with the former electrode, and is made of conductive material, as thick as 0.2 to 0.5 mm., such as aluminum, brass, copper or silver in tubular form (FIG. 2).

In the next process the assembly 4 formed of the metal internal electrode 1, the intermediate layer 2, and the metal external electrode 3, as described above, is given strong mechanical pressure externally on a swaging machine or rolling mill or drawing dies to be pressed and elongtaed in its axial direction and made slender to a degree of about 1.3 times as thick as the internal electrode 1 (FIG. 3).

Such pressing and elongating process may consist of several stages, where the intermediate layer 2 is elongated about 1.1 times as thick as the internal electrode 1. It is therefore necessary to cut off some portion of the layer 2 previously in consideration of the elongating ratio. Otherwise, such portion may be left, stretching out of the end of the external tube, that is, the external electrode 3. Through this process individual members of the combination are pressed to contact each other.

Now, the combination is cut into pieces at a certain length so that any specific capacity may be obtained between the external electrode 3 and the internal electrode 1 or by peeling off part of the external electrode 3. The metal external and internal electrodes 3 and 1 serve as two electrodes for a capacitor (FIG. 4) to which lead wires A and B are connected respectively. Here is a final product (FIG. 5).

Such lead wires A and B may be connected and taken out easily by spot weldering or soldering to fix them upon the internal and external electrodes. It is better to use aluminium of high purity and soft quality, if such is the case.

The end of the external electrod 3 is preferably rounded off at an arc 5. Capacitors with lead wires provided may be given final treatment by cleansing, drying and painting, if required. As the intermediate layer 2 made of dielectric material, such material as a mixture of synthetic resin as a base and simple substance of small dielectric loss such as titanium oxide or barium titanate or composite substance thereof as additive may also be used.

Shown in the embodiment of FIG. 6 is a method of manufacturing a capacitor: A conductive internal electrode 1 in linear or tubular form is continuously sent out and supplied, around which synthetic resin or dielectric material containing synthetic resin is coated 2 in tube by means of successive forming operation for continuous supply, and with such dielectric material supplied a conductive external electrode 3 in tape form is fed to the tubular external coating 2 of the dielectric material for continuous rolling-up, and then such a capacitor assembly 4 consisting of the internal electrode 1, the intermediate dielectric layer 2, and the external electrode 3 is elongated by rolling into a slender line or tube in continuity.

As the intermediate dielectric layer 2 may be used synthetic resin such as polyethylene or polystyrene or a mixture of such synthetic resin and simple substance of small dielectric loss such as titanium oxide or barium titanate or composite substance thereof. For such continuous tube forming process it is preferred to use an injection tubing machine 2' for injection molding. For elongating and making slender into linear or tubular form the thinned composition 4 consisting of the internal electrode 1, the tubular intermediate layer 2 of dielectric and the external electrode 3 rolled up therearound by means of a rolling mill 4', swaging machines 6 and 6' are used, which will give heavy mechanical strike or pressure or both of them in the axial direction of the tube for gradually forming it into such slender line or tube. Such rolling process may be more effective, if divided into several stages, as the members can be pressed to contact closely each other and made slender as desired. Now, the thinned capacitor assembly 4 thus formed into a slender line is cut into pieces at a specific length successively by means of a cutting roll 7 so that capacity as desired may be produced, and then provided with lead wires A and B. Here is a final product C.

FIG. 7 shows another method of manufacturing a capacitor: A conductive internal electrode 1 in linear or tubular form is sent out and supplied continuously, around which synthetic resin such as monofilament fibers made of polyester, polypropylene or other plastic of small elongation and relatively high heat resistance or polyester tape or dielectric material containing such synthetic resin is provided to be wound externally by means of a winding machine 2" as an intermediate layer 2 to a predetermined thickness (for example, up to 0.04 mm. possible (relative to the thickness of the external electrode 3 after determination of number of winding, tape thickness or denier, and with the intermediate layer 2 thus covered supplied a tape-shaped conductive external electrode 3 is fed continuously for rolling up the tubular intermediate layer 2 thus covered externally or a pipe-shaped conductive external electrode is set in tube to form a multi-thinned capacitor assembly 4. This thinned composition 4 consisting of the internal electrode 1, the intermediate layer 2 and the external electrode 3 is then elongated by striking and elongating by means of a drawing machine 6 into slender line or tube-form, and heated in a heating section 8 at a temperature over the melting point of the external substance, and thereafter cut into pieces for any specific capacity successively by means of a cutting machine 7.

In the above process it is possible to provide another heating secton 8' for preheating the external substance of the intermediate layer 2 over its melting temperature after the rope winding or double winding by means of a winding machine 2" together with a die 9 and a cooling section 10 to cool the heated substance. The external electrode 3 may be then supplied for rolling up, as the case may be. It is also possible to add another process of pressing after heating in the heating section 8, by means of a swaging machine permitting the pressing or elongation into linear or tubular form or another elongating machine 6' such as drawing dies. Such manufacturing process is at your option.

Instead of the above-mentioned monofilament fibers as winding material to form the dielectric intermediate layer 2 film, for example, polyester tape of 2 to 10 mm. wind and 0.01 to 0.013 mm. thick or polyester filament threads of 180 denier may be used, which will be preheated. Such fibers used as the intermediate layer material 2 are heated by adjusting the heating section 8, for instance, at temperature of 240 degrees or higher for polyester, and 150 degrees or higher for polypropylene. It is also possible to color them by dyeing, if needed.

It will be readily understood that a product C may be finished through such ordinary processes as cleansing, drying, impressing, painting and measuring, if required.

In the drawings 11 represents cleansing and drying section, 12 impressing section, 13 painting section, and 14 measuring section for products.

As described above, in accordance with the present invention capacitors can be manufactured by striking and elongating into a rolled slender line form a combination of a conductive internal electrode, an intermediate layer made of dielectric material, and a conductive external electrode arranged concentrically in such order, whereby main manufacturing processes for capacitors become a continuous and through operation, which permits the manufacture of capacitors with high efficiency. It is thus achieved to decrease such processes in number and in the cost of manufacture, and effect a radical reduction in production cost.

It is also possible to make capacitors of high quality, which are hard to damage by external mechanical force in a simple flow process, to adapt line-shaped products coming out successively to capacity as desired by cutting into pieces at any length, and to bend them into any shape or fit to the shape of portion for application. Such are great advantages of this invention.

Furthermore, in accordance with the invention no precious metal is required for electrodes for ordinary use with the result of reduction in materials cost, and making the production economical. Particularly, the coating or covering by winding of an internal electrode can be made not only with extreme easiness but also with high evenness with the result of considerable reduction in capacity difference. A high value of $\eta$ can be obtained without troublesome selection for capacity.

Still furthermore, in accordance with this invention an inter-electrode gap can be remarkably decreased to increase the capacity therebetween. The distance may be only 0.04 mm. or so without causing cracks on a product. Thus, products of good stability can be obtained without complicated, various process control. In addition, insulating material is supplied evenly as thick as the distance between two electrodes, and capacitors of high quality can be supplied at a low price.

What is claimed is:

1. A method for manufacturing capacitors comprising, first, providing a longitudinally extending length of conductive internal electrode in rod or tube form; second, continuously applying to the entire outer peripheral surface of said conductive internal electrode a substantially uniform intermediate layer selected from the group consisting of a synthetic resin, a dielectric material containing a synthetic resin, and a synthetic resin having an additive of small dielectric loss dispersed evenly therein; next, continuously wrapping a tape-shaped conductive external electrode about the peripheral surface of said covered length of conductive internal electrode to form a capacitor assembly; then, striking and elongating said capacitor assembly to thin and press the layered components thereof together; and subsequently, cutting said capacitor assembly into individual capacitors of substantially uniform cross-section and of a length determined by the desired capacitance thereof.

2. A method for manufacturing capacitors comprising, first, providing a longitudinally extending length of conductive internal electrode in rod or tube form; second, continuously winding, as an intermediate layer, a length of synthetic resin or dielectric material containing a synthetic resin about the entire outer peripheral surface of said conductive internal electrode to cover said peripheral surface; next, continuously surrounding said covered conductive internal electrode with a pipe-like or tape-shaped conductive external electrode to form a capacitor assembly; then, striking and elongating said capacitor assembly to thin and press together the layered components thereof, and heating said assembly to a temperature above the melting temperature of said intermediate layer; and subsequently, cutting said capacitor assembly into individual capacitors of substantially uniform cross-section and of a length determined by the desired capacitance thereof.

3. A method for manufacturing capacitors as recited in claim 2, wherein said length of synthetic resin or dielectric material containing a synthetic resin is in the form of a tape.

4. A method for manufacturing capacitors as recited in claim 2, wherein said length of synthetic resin or dielectric material is formed from at least one monofilament fiber.

5. A method for manufacturing capacitors as recited in claim 2, wherein said length of synthetic resin or dielectric material containing a synthetic resin is formed from filament threads.

References Cited

UNITED STATES PATENTS

| 3,270,261 | 8/1966 | Mohler et al. | 317—258 |
| 3,287,789 | 11/1966 | Braun et al. | 29—25.42 |
| 3,334,975 | 8/1967 | Quaas et al. | 29—504 XR |

FOREIGN PATENTS

| 667,532 | 3/1952 | Great Britain. |

JOHN F. CAMPBELL, *Primary Examiner.*

RICHARD BERNARD LAZARUS, *Assistant Examiner.*